(12) United States Patent
Lah et al.

(10) Patent No.: US 8,545,680 B2
(45) Date of Patent: Oct. 1, 2013

(54) CENTER FEED SYSTEM

(75) Inventors: Ruben F. Lah, South Jordan, UT (US); Gary Larsen, West Jordan, UT (US)

(73) Assignee: Curtiss-Wright Flow Control Corporation, Falls Church, VA (US)

( * ) Notice: Subject to any disclaimer, the term of this patent is extended or adjusted under 35 U.S.C. 154(b) by 636 days.

(21) Appl. No.: 12/703,644

(22) Filed: Feb. 10, 2010

(65) Prior Publication Data

US 2010/0252409 A1    Oct. 7, 2010

Related U.S. Application Data

(63) Continuation-in-part of application No. 12/369,691, filed on Feb. 11, 2009.

(51) Int. Cl.
C10G 9/14 (2006.01)

(52) U.S. Cl.
USPC ........... 202/239; 202/121; 202/241; 202/254; 202/255; 202/262; 196/127; 196/135; 196/137

(58) Field of Classification Search
USPC .............. 202/239, 121, 241, 254, 255, 262; 196/127, 135, 137; 141/311 R; 137/240
See application file for complete search history.

(56) References Cited

U.S. PATENT DOCUMENTS

| | | | |
|---|---|---|---|
| 176,321 A | 4/1876 | Kromer | |
| 1,656,355 A | 1/1928 | Huffmann | |
| 1,991,621 A | 2/1935 | Noll | |
| 2,064,567 A | 12/1936 | Riley | |
| 2,245,554 A | 6/1941 | Court | |
| 2,317,566 A | 4/1943 | Utterback | |
| 2,403,608 A | 7/1946 | Payne et al. | |
| 2,562,285 A | 7/1951 | Timmer | |
| 2,717,865 A | 9/1955 | Kimberlin, Jr. et al. | |
| 2,734,715 A | 2/1956 | Knox | |
| 2,761,160 A | 9/1956 | Manning | |
| 2,950,897 A | 8/1960 | Bryant | |
| 3,215,399 A | 11/1965 | McInerney et al. | |
| 3,367,625 A | 2/1968 | Fortune | |
| 3,379,623 A | 4/1968 | Forsyth | |
| 3,498,323 A * | 3/1970 | Rahm | 137/592 |
| 3,617,480 A | 11/1971 | Keel | |

(Continued)

FOREIGN PATENT DOCUMENTS

| | | |
|---|---|---|
| JP | 2000145989 | 5/2000 |
| RU | 2043604 | 10/1995 |

(Continued)

OTHER PUBLICATIONS

Zappe, R.W., Valve Selection Handbook, Fourth Edition, Gulf Publishing Company, Houston, Texas.

(Continued)

*Primary Examiner* — Nina Bhat
(74) *Attorney, Agent, or Firm* — Kirton McConkie; Michael F. Krieger

(57) ABSTRACT

A center feed system for use within a delayed coking system, or any other similar system is described. The center feed system features an inlet sleeve which slidably engages a retractable nozzle, with inlet and outlet, in fluid connection with a feed source of residual byproduct, allowing residual byproduct to flow from the feed source into the interior of a vessel, thus effectuating or inducing even thermal distribution throughout the vessel.

20 Claims, 11 Drawing Sheets

(56) References Cited

U.S. PATENT DOCUMENTS

| | | |
|---|---|---|
| 3,646,947 A | 3/1972 | Rochelle et al. |
| 3,716,310 A | 2/1973 | Guenther |
| 3,837,356 A | 9/1974 | Selep et al. |
| 3,852,047 A | 12/1974 | Schlinger et al. |
| 4,125,438 A | 11/1978 | Kelly et al. |
| 4,174,728 A | 11/1979 | Usnick et al. |
| 4,253,487 A | 3/1981 | Worley et al. |
| 4,275,842 A | 6/1981 | Purton et al. |
| 4,335,733 A | 6/1982 | Richards |
| 4,410,398 A | 10/1983 | Chipman et al. |
| RE31,439 E | 11/1983 | Rosensweig |
| 4,492,103 A | 1/1985 | Naumann |
| 4,531,539 A | 7/1985 | Jandrasi et al. |
| 4,611,613 A | 9/1986 | Kaplan |
| 4,626,320 A | 12/1986 | Alworth et al. |
| 4,666,585 A | 5/1987 | Figgins et al. |
| 4,726,109 A | 2/1988 | Malsbury et al. |
| 4,738,399 A | 4/1988 | Adams |
| 4,771,805 A | 9/1988 | Maa |
| 4,797,197 A | 1/1989 | Mallari |
| 4,824,016 A | 4/1989 | Cody et al. |
| 4,877,488 A | 10/1989 | Cody et al. |
| 4,923,021 A | 5/1990 | Courmier et al. |
| 4,929,339 A | 5/1990 | Elliott, Jr. et al. |
| 4,960,358 A | 10/1990 | Digiacomo et al. |
| 4,973,386 A | 11/1990 | Callegari et al. |
| 4,993,264 A | 2/1991 | Cody et al. |
| 5,004,152 A | 4/1991 | Baker et al. |
| 5,022,266 A | 6/1991 | Cody et al. |
| 5,022,268 A | 6/1991 | Wolf et al. |
| 5,024,730 A | 6/1991 | Colvert |
| 5,035,221 A | 7/1991 | Martin |
| 5,041,207 A | 8/1991 | Harrington et al. |
| 5,048,876 A | 9/1991 | Wallskog |
| 5,059,331 A | 10/1991 | Goyal |
| 5,107,873 A | 4/1992 | Clinger |
| 5,116,022 A | 5/1992 | Genreith et al. |
| 5,221,019 A | 6/1993 | Pechacek et al. |
| 5,228,525 A | 7/1993 | Denney et al. |
| 5,228,825 A | 7/1993 | Fruchtbaum et al. |
| 5,299,841 A | 4/1994 | Schaefer |
| 5,417,811 A | 5/1995 | Malsbury |
| H1442 H | 6/1995 | Edgerton et al. |
| 5,464,035 A | 11/1995 | Heinecke |
| 5,581,864 A | 12/1996 | Rabet |
| 5,633,462 A | 5/1997 | Heaslip et al. |
| 5,652,145 A | 7/1997 | Cody et al. |
| 5,785,843 A | 7/1998 | Antalffy et al. |
| 5,800,680 A | 9/1998 | Guerra |
| 5,816,505 A | 10/1998 | Tran et al. |
| 5,816,787 A | 10/1998 | Brinkerhoff et al. |
| 5,876,568 A | 3/1999 | Kindersley |
| 5,907,491 A | 5/1999 | Canada et al. |
| 5,927,684 A | 7/1999 | Marx et al. |
| 5,947,674 A | 9/1999 | Malsbury et al. |
| 5,974,887 A | 11/1999 | Cody et al. |
| 6,007,068 A | 12/1999 | Dellacorte |
| 6,039,844 A | 3/2000 | Malik |
| 6,066,237 A | 5/2000 | Kindersley |
| 6,113,745 A | 9/2000 | Maitland et al. |
| 6,117,308 A | 9/2000 | Ganji |
| 6,223,925 B1 | 5/2001 | Malsbury et al. |
| 6,228,225 B1 | 5/2001 | Meher-Homji |
| 6,254,733 B1 | 7/2001 | Lu et al. |
| 6,264,797 B1 | 7/2001 | Schroeder et al. |
| 6,264,829 B1 | 7/2001 | Antalffy et al. |
| 6,367,843 B1 | 4/2002 | Fetzer |
| 6,539,805 B2 | 4/2003 | Heaslip et al. |
| 6,547,250 B1 | 4/2003 | Noble et al. |
| 6,565,714 B2 | 5/2003 | Lah |
| 6,644,436 B2 | 11/2003 | Hofmann et al. |
| 6,644,567 B1 | 11/2003 | Adams et al. |
| 6,660,131 B2 | 12/2003 | Lah |
| 6,738,697 B2 | 5/2004 | Breed |
| 6,751,852 B2 | 6/2004 | Malsbury et al. |
| 6,843,889 B2 | 1/2005 | Lah |
| 6,926,807 B2 | 8/2005 | Bosi et al. |
| 6,964,727 B2 | 11/2005 | Lah |
| 6,989,081 B2 | 1/2006 | Lah |
| 7,033,460 B2 | 4/2006 | Lah |
| 7,037,408 B2 | 5/2006 | Wilborn et al. |
| 7,115,190 B2 | 10/2006 | Lah |
| 7,117,959 B2 | 10/2006 | Lah |
| 7,316,762 B2 | 1/2008 | Lah |
| 7,736,470 B2 * | 6/2010 | Chen et al. ............... 201/25 |
| 2002/0134658 A1 | 9/2002 | Lah |
| 2002/0157897 A1 | 10/2002 | Hofmann et al. |
| 2002/0166862 A1 | 11/2002 | Malsbury et al. |
| 2002/0170814 A1 | 11/2002 | Lah |
| 2003/0047153 A1 | 3/2003 | Kubel et al. |
| 2003/0089589 A1 | 5/2003 | Malsbury |
| 2003/0127314 A1 | 7/2003 | Bell et al. |
| 2003/0159737 A1 | 8/2003 | Stares |
| 2003/0185718 A1 | 10/2003 | Sellakumar |
| 2004/0118746 A1 | 6/2004 | Wilborn et al. |
| 2004/0154913 A1 | 8/2004 | Lah |
| 2005/0161372 A1 * | 7/2005 | Colic ............... 208/391 |
| 2009/0209799 A1 * | 8/2009 | Etter et al. ............... 585/653 |

FOREIGN PATENT DOCUMENTS

| | | |
|---|---|---|
| RU | 2163359 C1 | 2/2001 |
| SU | 558524 | 11/1973 |
| SU | 558524 A | 11/1973 |
| SU | 959413 | 12/1980 |
| SU | 959413 A | 12/1980 |
| WO | 0015985 | 3/2000 |

OTHER PUBLICATIONS

U.S. Appl. No. 10/731,874, Non-Final Rejection issued Feb. 23, 2005 by the United States Patent and Trademark Office. pp. 1-10.

U.S. Appl. No. 10/731,874, Final Rejection issued Jun. 28, 2005 by the United States Patent and Trademark Office. pp. 1-7.

U.S. Appl. No. 10/731,874, Examiner's search and strategy results issued Sep. 26, 2005. 1 page.

U.S. Appl. No. 10/731,874, Notice of Allowance of Fees Due, Issue Information, Index of Claims and Search information issued Sep. 29, 2005 by the United States Patent and Trademark Office; 7 pages.

U.S. Appl. No. 10/731,874, Notice of Allowance of Fees Dues, List of References, Issue Information, Search information and index of claims issued Jan. 18, 2006 by the United States Patent and Trademark Office; 10 pages.

U.S. Appl. No. 10/731,874, Non-Final Rejection issued Oct. 13, 2006 by the United States Patent and Trademark Office; 22 pages.

U.S. Appl. No. 10/731,874, Non-Final Rejection issued Apr. 26, 2007 by the United States Patent and Trademark Office; 14 pages.

U.S. Appl. No. 10/731,874, Requirement for Restriction/Election, List of References and index of claims issued Sep. 6, 2007 by the United States Patent and Trademark Office; 20 pages.

U.S. Appl. No. 10/731,874, Examiner's search strategy and results issued Dec. 5, 2007, 1 page.

U.S. Appl. No. 10/731,874, Non-Final Rejection issued Dec. 11, 2007 by the United States Patent and Trademark Office; 22 pages.

U.S. Appl. No. 10/997,834, Examiner's search strategy and results issued Jun. 22, 2005; 5 pages.

U.S. Appl. No. 10/997,834, Non-Final Rejection issued Jul. 6, 2005 by the United States Patent and Trademark Office; 44 pages.

U.S. Appl. No. 10/997,834, Examiner's search strategy and results issued Sep. 26, 2005; 1 page.

U.S. Appl. No. 10/997,834, Notice of Allowance and Fees, Issue Information, Index of Claims and search information issued Sep. 29, 2005 by the United States Patent and Trademark Office; 8 pages.

U.S. Appl. No. 10/411,849, Examiner's search strategy and results issued Aug. 4, 2005; 5 pages.

U.S. Appl. No. 10/411,849, Non-Final Rejection issued Aug. 9, 2005 by the United States Patent and Trademark Office; 8 pages.

U.S. Appl. No. 10/411,849, Non-Final Rejection issued Feb. 8, 2006 by the United States Patent and Trademark Office; 7 pages.

U.S. Appl. No. 10/411,849, Examiner's search strategy and results issued Jul. 18, 2006; 1 page.

U.S. Appl. No. 10/411,849, Notice of Allowance and Fees Due, Examiner Interview Summary Record, Issue Information, Index of Claims, Search Information and Bibliographic Data Sheet issued Jul. 24, 2006 by the United States Patent and Trademark Office; 14 pages.

U.S. Appl. No. 10/997,234, Examiner's search strategy and results issued Mar. 14, 2006; 3 pages.

U.S. Appl. No. 10/997,234, Non-Final Rejection issued Mar. 20, 2006 by the United States Patent and Trademark Office, 13 pages.

U.S. Appl. No. 10/997,234, Examiner's search strategy and results issued Aug. 4, 2006; 1 page.

U.S. Appl. No. 10/997,234, Notice of Allowance and Fees Due, Issue Information, Bibliographic Data Sheet, Index of Claims and Search Information issued Aug. 10, 2006 by the United States Patent and Trademark Office, 8 pages.

U.S. Appl. No. 10/412,628, Non-Final Rejection issued Feb. 16, 2007 by the United States Patent and Trademark Office; 17 pages.

U.S. Appl. No. 10/412,628, Notice of Allowance and Fees Due, Bibliographic Data Sheet, Index of Claims, Search Information and Issue Information issued Aug. 24, 2007, by the United States Patent and Trademark Office; 11 pages.

U.S. Appl. No. 10/873,022, Non-Final Rejection issued Jul. 7, 2005 by the United States Patent and Trademark Office, 12 pages.

U.S. Appl. No. 10/873,022, Notice of Allowance and Fees Due, Specification and Issue Information issued Jun. 4, 2006 by the United States Patent and Trademark Office, 9 pages.

U.S. Appl. No. 10/274,280, Examiner's search strategy and results issued Mar. 14, 2004; 2 pages.

U.S. Appl. No. 10/274,280, Non-Final Rejection issued Mar. 25, 2004 by the United States Patent and Trademark Office; 10 pages.

U.S. Appl. No. 10/274,280, Notice of Allowance and Fees Due, Issue Information and Bibliographic Data Sheet issued Oct. 5, 2004 by the United States Patent and Trademark Office; 8 pages.

U.S. Appl. No. 10/442,673, Examiner's search strategy and results issued Aug. 26, 2004, 2 pages.

U.S. Appl. No. 10/442,673, Non-Final Rejection issued Sep. 1, 2004 by the United States Patent and Trademark Office; 10 pages.

U.S. Appl. No. 10/442,673, Final Rejection issued Feb. 23, 2005 by the United States Patent and Trademark Office; 6 pages.

U.S. Appl. No. 10/442,673, Notice of Allowance and Fees Due, Amendment After Final, Issue Information, Index of Claims and Search Information issued Apr. 20, 2005 by the United States Patent and Trademark Office; 10 pages.

J. J. Kelley, "Applied Artificial Intelligence for Delayed Coking", Hydrocarbon Processing, Nov. 2000, 144-A-144-J, Gulf Publishing Company, USA.

Claudio Allevato & Richard S. Boswell, "Assessing the Structural Integrity and Remaining Life of Coke Drums with Acoustic Emission Testing, Stain Gaging, and Finite Element Analysis," ETCE 99—Symposium on Plant and Facilities Reliability and Mechanical Integrity, 1999 Engineering Source Technology Conference & Exhibition, Stress Engineering Services, Inc.

Norm Lieberman, "Coke Drum Foam-Overs Causes & Cures," http://www.coking.com/Foamover.htm.

Paul J. Ellis & Christopher A. Paul, "Tutorial: Delayed Coking Fundamentals," AIChE 1998 Spring National Meeting's International Conference on Refinery Processes Topical Conference Preprints 1998, 1998, Great Lakes Carbon Corporation.

* cited by examiner

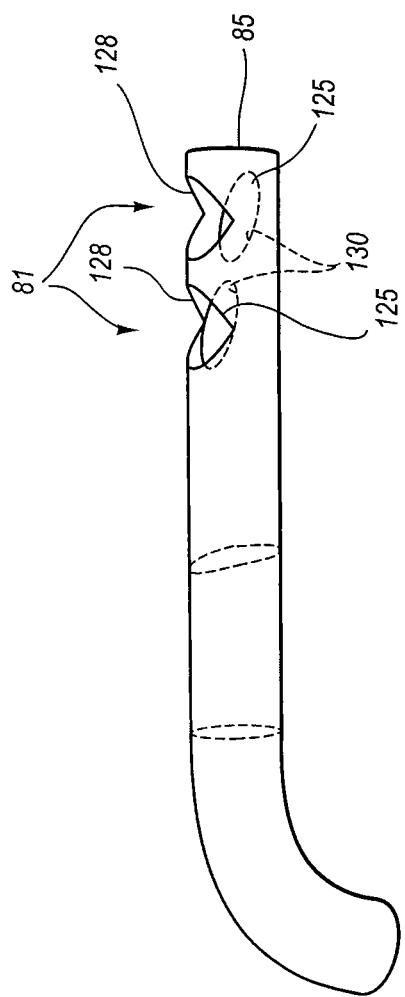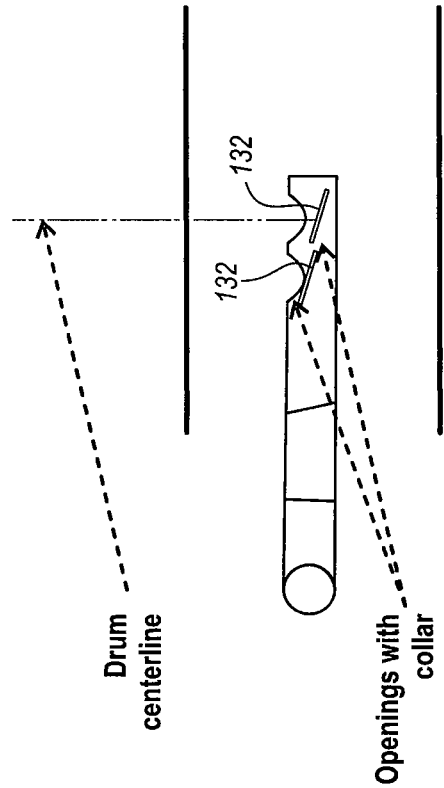

CENTER FEED SYSTEM

RELATED APPLICATIONS

This application is a continuation-in-part from U.S. patent application Ser. No. 12/369,691, filed Feb. 11, 2009, and entitled, "Center Feed System."

BACKGROUND

1. Field of the Invention

The present invention relates to a center feed system for use with a coking operation, which may be utilized to dispense residual by-product, steam and or quench fluid into a vessel, such as petroleum feed stocks into a coke drum.

2. Background of the Invention and Related Art

In the hydrocarbon processing industry, many refineries recover valuable products from the heavy residual oil that remains after refining operations are completed. This recovery process is known as delayed coking. Delayed coking produces valuable distillates, leaving coke as a by-product in large vessels or coke drums. The process of delayed coking involves directing a flow of residual byproduct through an inlet from a feed source into the vessel referred to as a coke drum.

The general trend in the delayed coking industry is towards increased safety, durability, efficiency, and reliability. Prior art designs for directing the flow of heated residual byproduct through an inlet from a feed source into a coke drum do not function to meet such goals. Utilizing a dispensing system that allows control over the dispensing, dispersion and flow patterns of residual byproducts, steam and quench fluid into a reservoir vessel may be desirable. As such, there is a need to improve how material and fluid including residual byproducts are injected into the large coke drums.

SUMMARY AND OBJECTS OF THE INVENTION

In accordance with the invention as embodied and broadly described herein, the present invention features a center feed injection system for use within a delayed coking system, or other similar system. Some embodiments of the center feed injection system comprise a spool coupled to a coke drum and a center feed injection system for depositing residual byproduct into the coke drum through an opening in the spool. In some embodiments, the center feed system comprises an injection nozzle, for introducing feed stock into a coke drum. In some embodiments, the center feed system comprises a retractable injection nozzle, which may be extended inwardly through an opening in the spool and/or a vessel for introducing a solid, liquid and/or gas including but not limited to feed stock, steam and quench fluids into a coke drum. Some embodiments may comprise an inlet sleeve in slidable engagement with a retractable injection nozzle. In some embodiments, a retractable nozzle may be retracted into an inlet sleeve out of the main body of the coke drum and/or a spool when not in use.

In some embodiments, the center feed system further comprises a pipe segment removable attached to the inlet of a spool, to facilitate controlled dispensing or dispersion of the residual byproduct into the reservoir vessel during a manufacturing process.

In some embodiments, the center feed system may further comprises pipe segments attached to the inlet spool structured to allow control over the thermal gradients within the center feed system itself.

Additionally, embodiments of the present invention may feature methods of dispensing residual byproduct into a reservoir vessel via one or more injection nozzles.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 9a and 9b illustrate a perspective view of a retractable injection nozzle according to one embodiment;

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 11, is not intended to limit the scope of the invention, as claimed, but is merely representative of the presently preferred embodiments of the invention. The presently preferred embodiments of the invention will be best understood by reference to the drawings wherein like parts are designated by like numerals throughout.

The present invention relates to methods and systems for dispensing residual byproducts into a reservoir vessel. Preferred embodiments relate particularly to dispensing petroleum byproducts into a coke drum as part of a delayed coking process. Various considerations affect the design of dispensing systems and methods. For example, utilizing a dispensing system that allows control over the flow patterns of residual byproducts into a reservoir vessel may be desirable. Examples of dispensing systems are illustrated throughout the figures.

Figure 1:
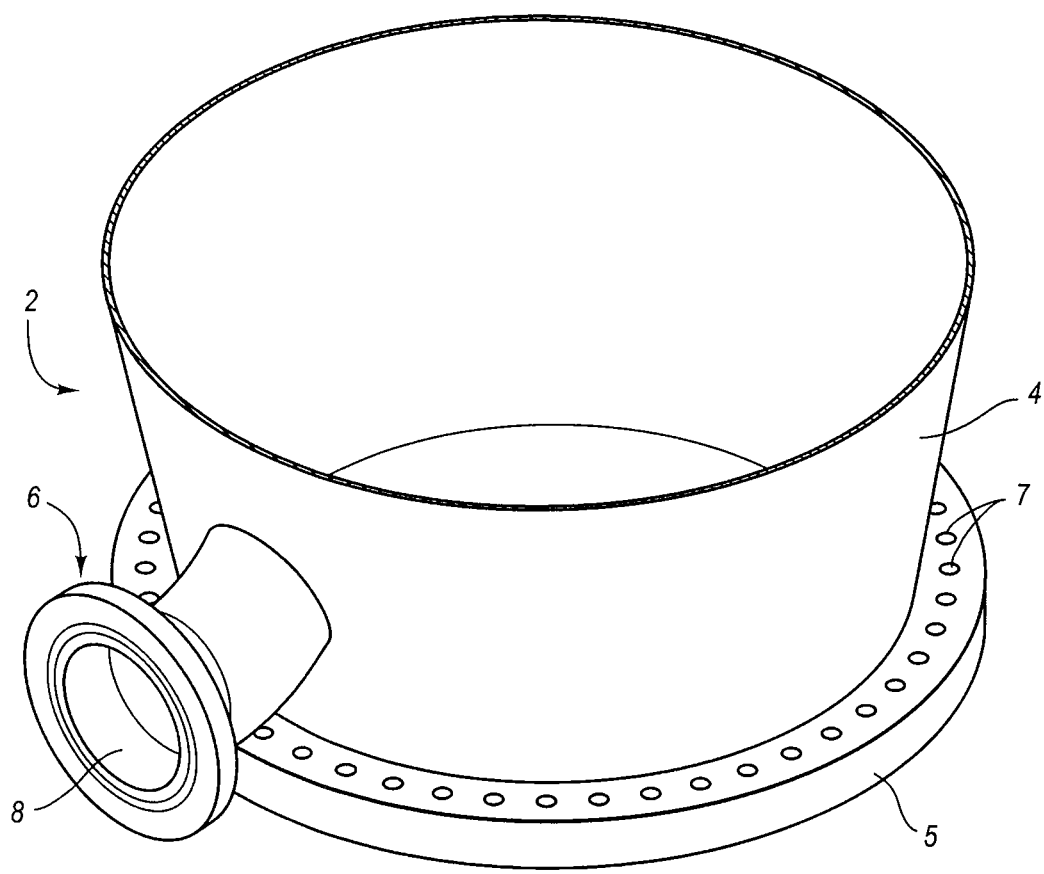
FIG. 1 illustrates a cut away perspective view of a dispensing system as coupled to a coke drum.
Figure 2:
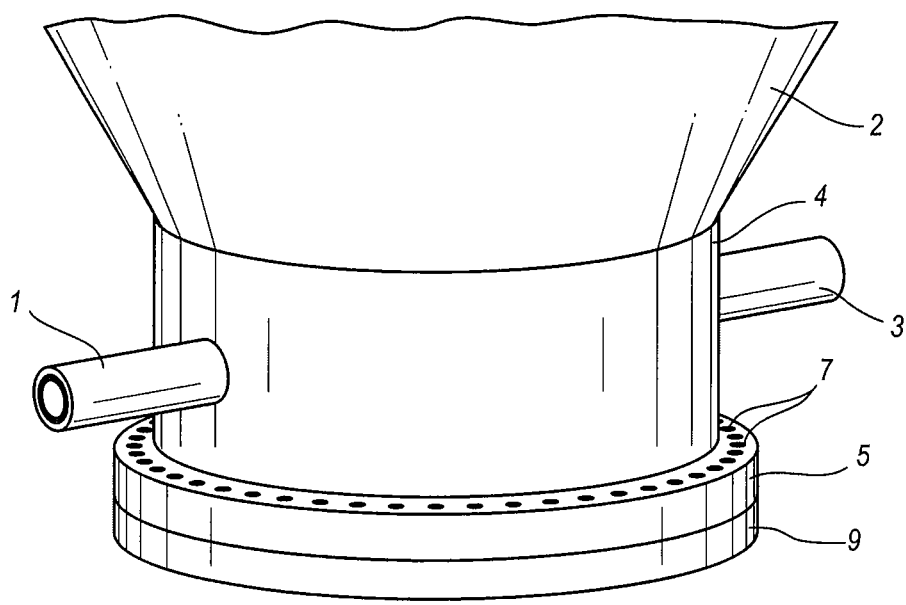
FIG. 2 illustrates a perspective view of another dispensing system, namely a system comprising two opposing, co-axial inlet feeds coupled to a coke drum.

FIGS. 1 and 2 illustrate examples of simple feed systems. As illustrated in systems depicted in FIGS. 1 and 2, the combination of pressure within the feedline and the high temperature of the residual byproduct produce significant force within the feedline as by-product enters an inlet. The residual byproduct may be propelled through the inlet, under pressure, into the interior of vessel at high velocities, hitting the inner side of sidewall support structure opposite the exit area of inlet. While the vessel may be pre-heated, for example to a temperature of about 450° Fahrenheit, the incoming byproduct may be injected into the drum at a significantly higher temperature, for example about 900° Fahrenheit. The high velocity stream of heated residual byproduct collides with the inside surface of the sidewall support body that is perpendicular or substantially perpendicular to the direction of the flow of the fast moving, heated residual byproduct.

While the simplicity of the system depicted in FIGS. 1 and 2 may be desirable, systems that allow for additional control over the flow of heated residual byproduct into the vessel may be desirable. For example, the sudden influx of heated, pressurized material into a stagnant vessel may cause stark heat distribution variances throughout vessel 2, the sidewall support body 4, the lower flange 5, bolts connecting the vessel to other components, and such as a de-header valve. The heated residual byproduct may be injected into vessel 2 and impact the opposite sidewall. The impacted wall and surrounding area instantly begins to heat. This impact point on the sidewall is the thermal center from which heat is initially distributed to the other adjacent areas of vessel 2. Once the residual byproduct enters the vessel, the opposing sidewall and the surrounding area is heated. Over time, the residual material gathers and builds up inside vessel 2 at a location opposite inlet 6. As this happens, the continuing influx of residual byproduct alternatively impacts the cooled, newly formed coke rather than the sidewall, altering the thermal center. As additional residual byproduct continues to be injected into vessel 2, the point of impact, and thus the thermal center, continues to move away from the opposing sidewall toward inlet 6, resulting in uneven heat distribution or thermal variance.

Uneven heat distribution, or thermal variance, existing within vessel 2 as a result of the influx of the residual byproduct in the manner described above induces uneven stress distribution within vessel 2, lower flange 5, and the corresponding flanged member coupled to vessel 2, the bolts coupling the two together and the attendant valve.

Further, the delayed coking process typically utilizes at least two vessels. While one vessel is being filled the other is being purged of material and prepped to receive another batch of byproduct. During the off-cycle when a vessel is being purged of its contents, it is cooled by water and returned to a state of equilibrium. This cyclical pattern of dispensing hot residual byproduct into vessel 2 and subsequently hydroblasting the byproduct contributes to the thermal differential and stress within vessel 2. Cyclical loading and unloading or stressing and unstressing of vessel 2 is referred to as thermal cycling. In addition to other factors, thermal cycling typically results in the weakening or fatiguing of vessel 2 and its component parts, which leads to a reduction in the useful life of vessel 2.

In addition to thermal variance within the vessel and injection systems, control over the flow of heated residual byproduct into the vessel may be desirable for myriad reasons. As another example, coke bed morphology may be influenced by various factors including flow channeling and quench characteristics. Flow channeling is a complex process that occurs when residual byproduct is injected into the bottom of a coke drum. For example, as the vessel begins to fill, the weight of residual byproduct pressing down may begin to influence flow channeling patterns of residual byproduct being injected into the vessel as it is ejected from an inlet. Differing flow channel patterns affect the coking process. The relationship between flow channel patterns and the coking process is complex. For example, flow channeling affects not only the introduction of residual byproduct into a coking vessel, but the introduction of steam in subsequent processes and the flow of quench fluid utilized to cool the coke bed. Even or uneven flow channeling may result in different quench characteristics.

Accordingly, the complicated process that produces a particular flow channeling pattern, for example uneven flow channeling or even flow channeling may have an attendant effect on thermal variance in the coke drum as it is being filled, the movement of steam through a coke bed injected into the coke bed to crack off volatile organic compounds and may result in altered quench characteristics including but not limited to the amount of water required to cool the coke bed and the path that quench fluid follows through the coke bed during the quench cycle. For example, uneven flow channeling resulting may result in uneven quench characteristics that may alter thermal variances in the coking vessel effectively decreasing the life span of a coke vessel.

As another example, uneven flow channeling may result in quench characteristics that cool portions of the drum and coke bed dramatically, while leaving areas of the coke bed that are not cooled sufficiently prior to being cut from the drum. Explosions of hot gas, liquid and particulate matter may occur as a cutting tool is lowered through the coke bed and the heated areas of the coke bed are encountered. These explosions can be dangerous.

FIG. 1 illustrates one type of dispenser or dispensing system. While the simplicity of the system depicted in FIG. 1 may be desirable, systems that allow for additional control over the flow of heated residual byproduct into the vessel 2 may be desirable. Specifically, FIG. 1 illustrates a cutaway perspective view of a dispenser or dispensing system attached or coupled to vessel 2, shown as a coke drum. Vessel 2 comprises a cylindrical sidewall support body 4 and a lower flange 5. Lower flange 5 further comprises a plurality of bolt holes 7 that are used to receive bolts therein to securely couple vessel 2 to another matching flanged member, such as a de-header valve or an intermediate spool assembly. Coupled to the vessel 2 is a byproduct dispenser 6, shown in the form of a cylindrical pipe having a flange segment and an opening 8 to allow inlet 6 to be in fluid connection with the interior of vessel 2. As a feedline is attached to inlet 6, the residual byproduct in the feedline may be received through opening 8 in inlet 6, routed through the pipe structure of inlet 6, and dispensed or disposed within vessel 2. A significant amount of uneven heat distribution, thermal variance and uneven flow channeling may exist within the vessel 2 because of the inability of the inlet feed 6 to dispense byproduct in a controlled and predictable manner.

FIG. 2 illustrates another type of dispenser or dispensing system. Specifically, FIG. 2 illustrates a perspective view of a dispenser or dispensing system attached or coupled to vessel 2, shown as a coke drum. Vessel 2 comprises a cylindrical sidewall support body 4 and a lower flange 5. Lower flange 5 further utilizes a plurality of bolt holes 7 that are used to receive high strength bolts to securely couple vessel 2 to another matching flanged member 9, such as a de-header valve or an intermediate spool assembly. Coupled to a vessel 2 is a first byproduct dispenser, shown as inlet feed 1, and a second byproduct dispenser, shown as inlet feed 3 positioned opposite and coaxial with one another. Each of inlet feeds 1 and 3 function to dispense byproduct into vessel 2 during delayed coking. Although the addition of another dispenser or inlet feed helps to alleviate some of the problems associated with the influx of residual by product into a coking vessel above under FIG. 1, the remedial effect or benefit of two opposing inlet feeds on these problems is only minimal. A significant amount of uneven heat distribution, thermal variance and uneven flow channeling still exists within the vessel 2 because of the inability of the inlet feeds 1 and 3 to dispense byproduct in a controlled and predictable manner.

Figure 3:
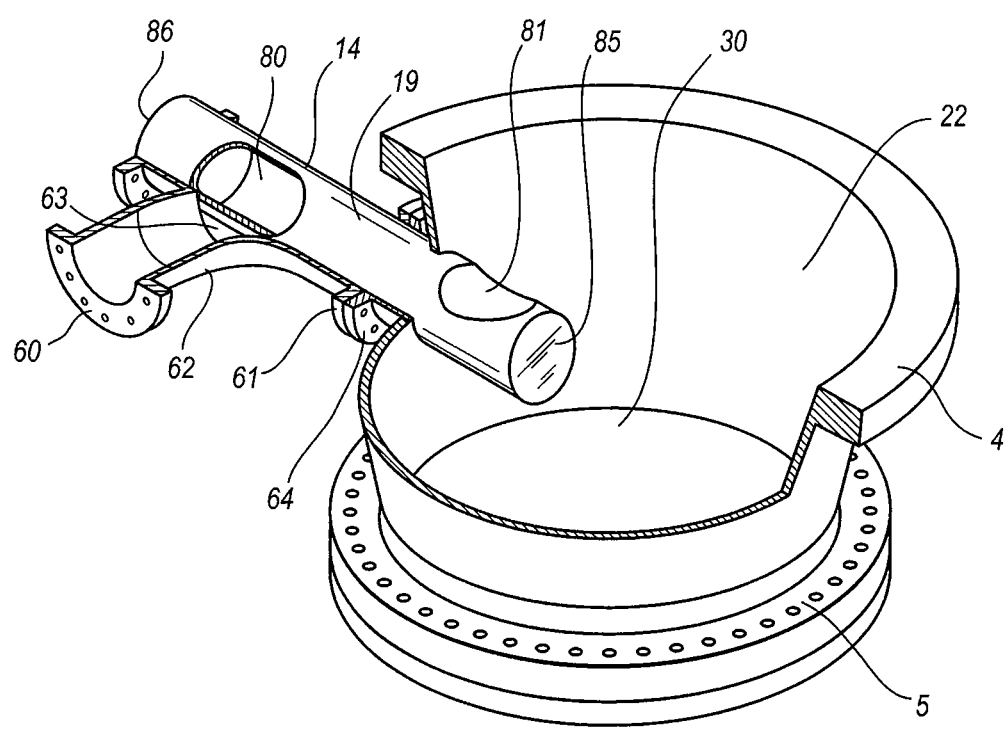
FIG. 3 illustrates a cut-away view of a center feed system in an open position, according to one embodiment, as it is coupled to a spool that attaches between a coke drum and a de-header valve in a delayed coking system.

FIG. 3, illustrates an embodiment of the present invention center feed injection system 10. This depicted system comprises a spool 20, a retractable injection nozzle 14, and an inlet sleeve 58 designed to operate within a delayed coking system. In some embodiments, spool 20 comprises a cylindrical or tapered axle or support body 32 having a sidewall 34, and an upper flange 24 and lower flange 28 formed at each end of axle 32, respectively. In typical de-header operations, spool 20 is positioned intermediately between a coke drum and a de-header valve. A coke drum may utilize a matching flange section that may be fitted and coupled to upper flange 24 of spool 20. Likewise, a de-header valve also having a matching flange section is fitted and coupled to lower flange 28. Spool 20 further comprises an interior 30 and an interior sidewall surface 22. In some installations the coke drum may be welded to the spool 20, or coupled to the spool 20 utilizing a plurality of bolts fitting through the plurality of bolt holes 36. Likewise, the de-header valve may be welded to the spool 20, or coupled to the spool 20 using a plurality of bolts fitting through the plurality of bolt holes 40.

Center feed system 10 may comprise an inlet sleeve 58 that functions to deliver residual byproduct to a retractable injection nozzle 14. Inlet sleeve 58 may comprise a flanged component 60, allowing the inlet sleeve 58 to couple to a feed line 112. When attached to a feed line 112, a residual byproduct, such as petroleum byproducts used in the manufacture of coke, may enter the center feed system 10.

Figure 6:
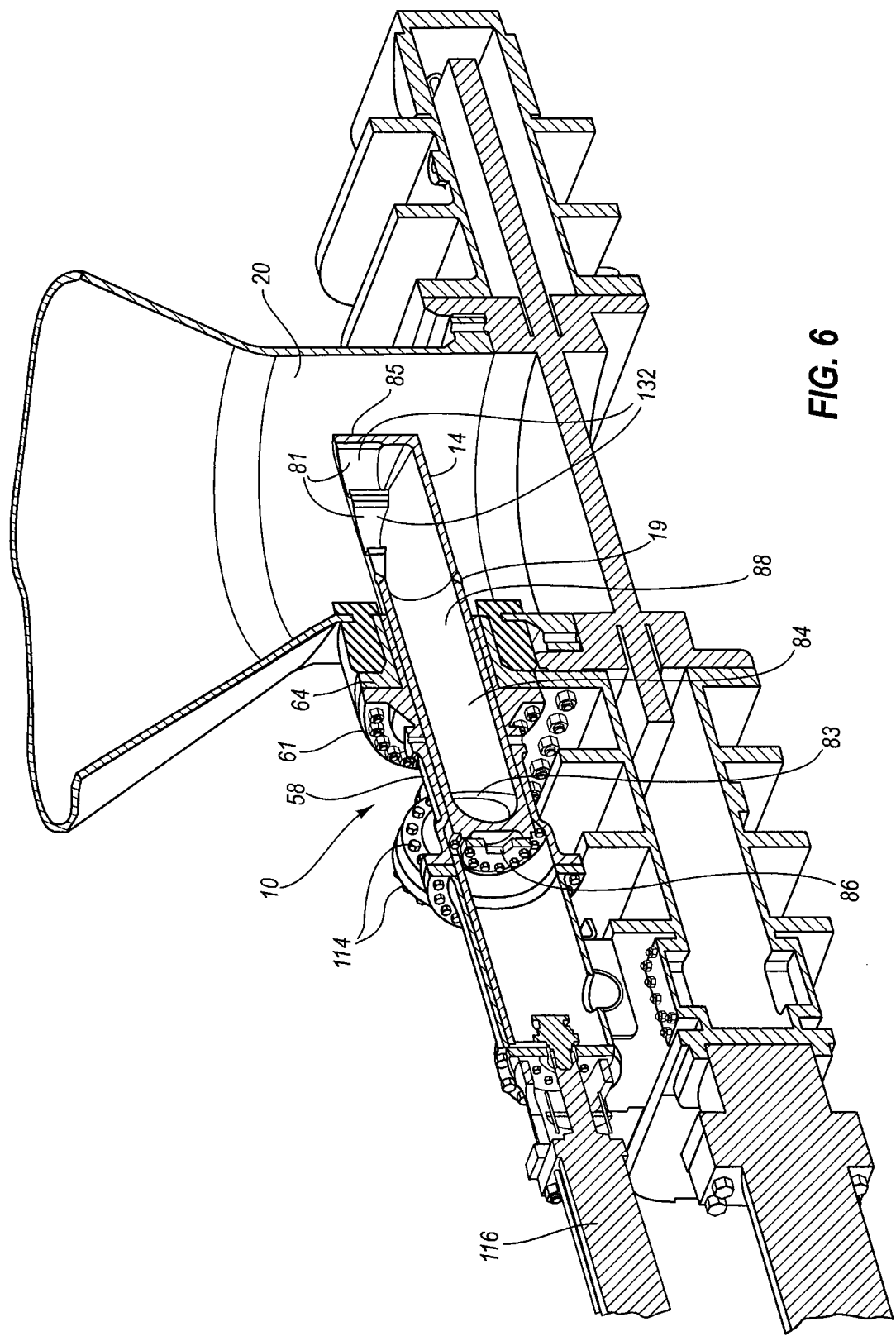
FIG. 6 illustrates a cut-away perspective view of an embodiment of center feed system.
Figure 7:
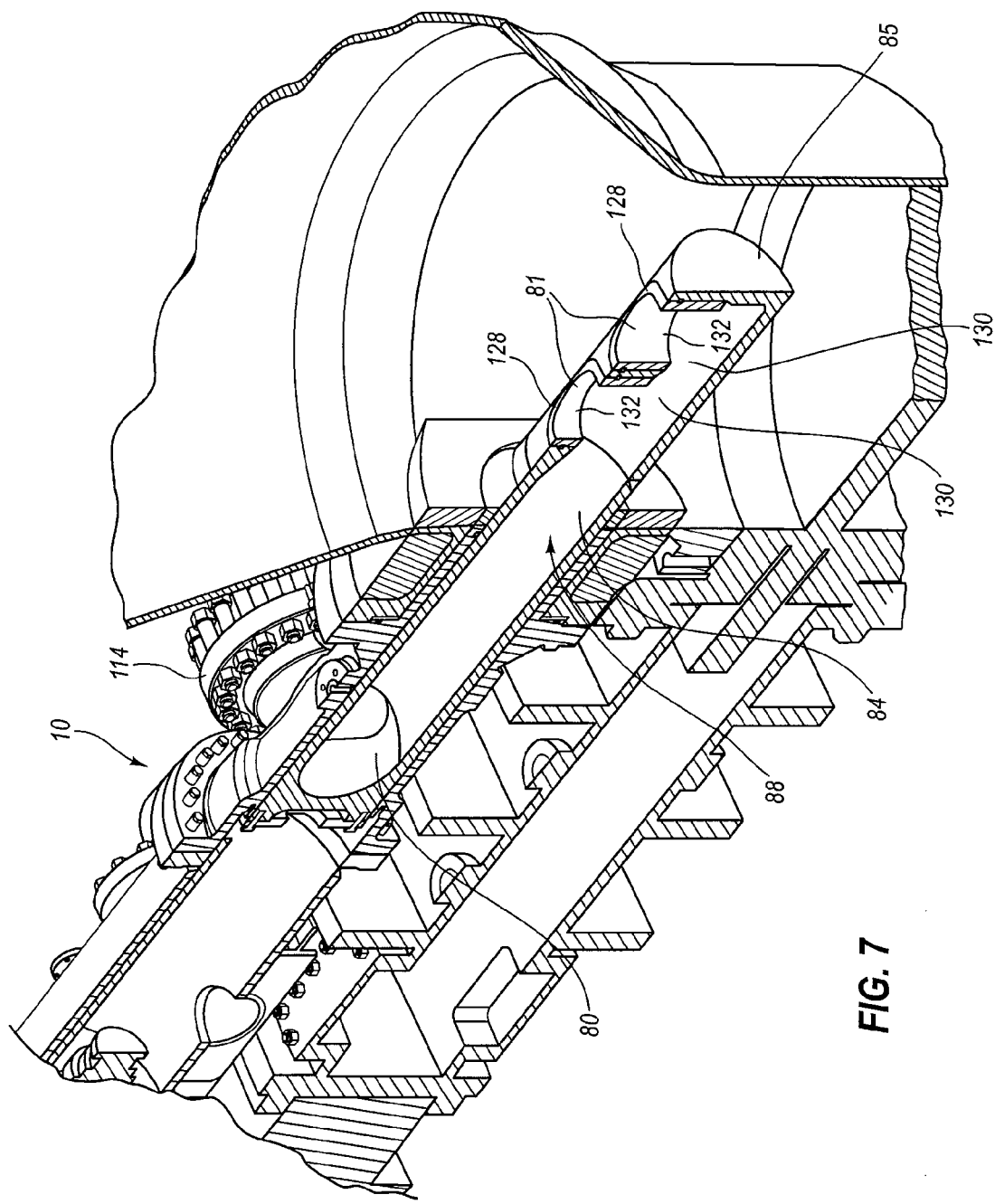
FIG. 7 illustrates a cut-away view of an embodiment of a center feed system and retractable nozzle.

In some embodiments, the retractable injection nozzle 14, when in an open position, as shown in FIGS. 3, 6, and 7, is in fluid communication with the inlet sleeve 58, allowing residual petroleum byproduct, steam and/or quench fluids to flow through the inlet sleeve 58 and into the retractable injection nozzle 14. When the retractable injection nozzle 14 is in the open position, petroleum byproduct, steam and/or quench fluids may be allowed to flow through the retractable injection nozzle 14 out an outlet 81 into the interior of the spool 30 or the interior of a vessel.

In some embodiments, the retractable injection nozzle 14 may be modified to adjust flow characteristics. In some embodiments, the straight portion 19 of the retractable injection nozzle 14 may be manufactured with pipe that has the same inside diameter as a curved pipe segment 62 of the inlet sleeve 58. Alternatively, the straight portion 19 of the retractable injection nozzle 14 may be manufactured with pipe that has a larger or smaller inside diameter as a curved pipe segment 62 of the inlet sleeve 58. In some embodiments, the straight portion 19 of the retractable injection nozzle 14 is coped precisely to fit the ellipse of a curved pipe segment 62. The shape of the injection nozzle 14 may also be shaped to be a seamless continuation of the contour of the curved pipe segment 62 when it is aligned in an open position to allow residual byproducts to flow into the vessel. In other embodiments, the outlet 81 of the retractable injection nozzle 14 may be constructed in various shapes and sizes. In some embodiments, the outlet 81 comprises an elliptical shape and has a diameter at least as large as the cross sectional diameter of the interior cavity 88 of the retractable injection nozzle 14, such that the outlet 81 allows for an even flow of residual byproduct into the spool 20 and vessel without increasing resistance to the flow of byproduct through the center feed system 10.

Figure 4:
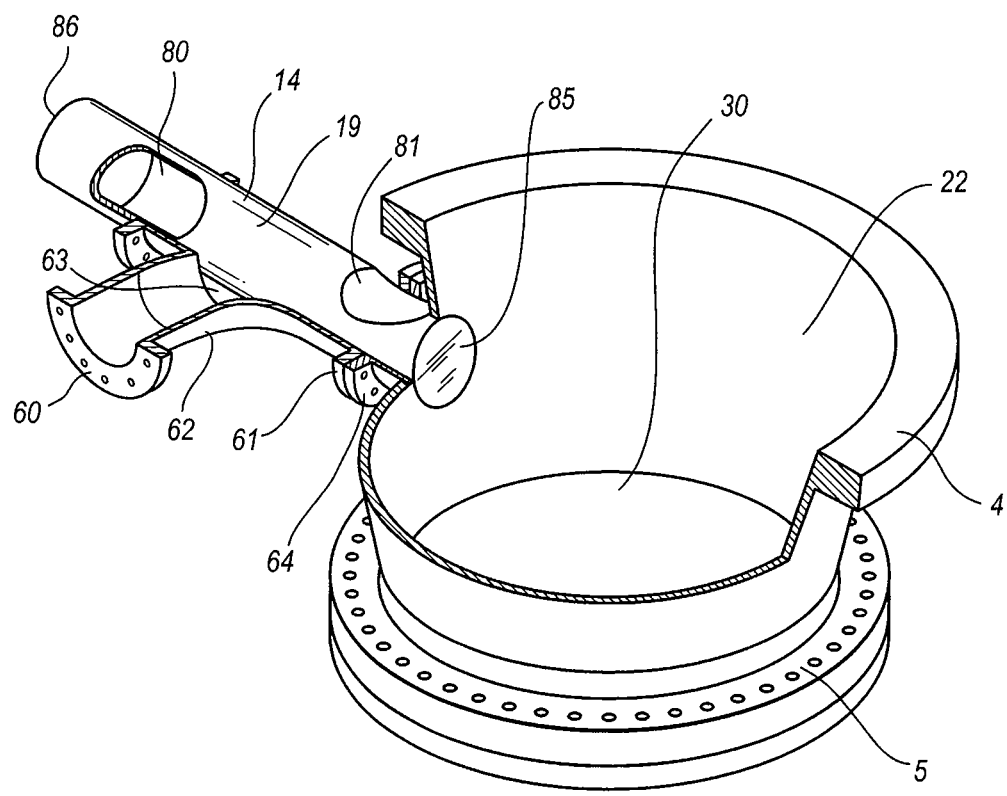
FIG. 4 illustrates a cut-away view of an embodiment of a center feed system in a retracted position.

The inlet sleeve 58 may comprise a flanged surface 60 proximate to, and being utilized to connect the inlet sleeve 58 to, a feed line 112 and may further comprise a second flanged surface 61 for connecting the inlet sleeve 58 to the flanged inlet 6 of a spool 20. In some embodiments, the inlet sleeve 58 is designed to hold and be slidably connected to a retractable injection nozzle 14 allowing the injection nozzle 14 to move from an open position, as illustrated in FIG. 3, to a retracted position, as illustrated in FIG. 4. The inlet sleeve 58 may also comprise a third flanged surface 114 for operably connecting the inlet sleeve 58 to an actuator 110.

Figure 5:
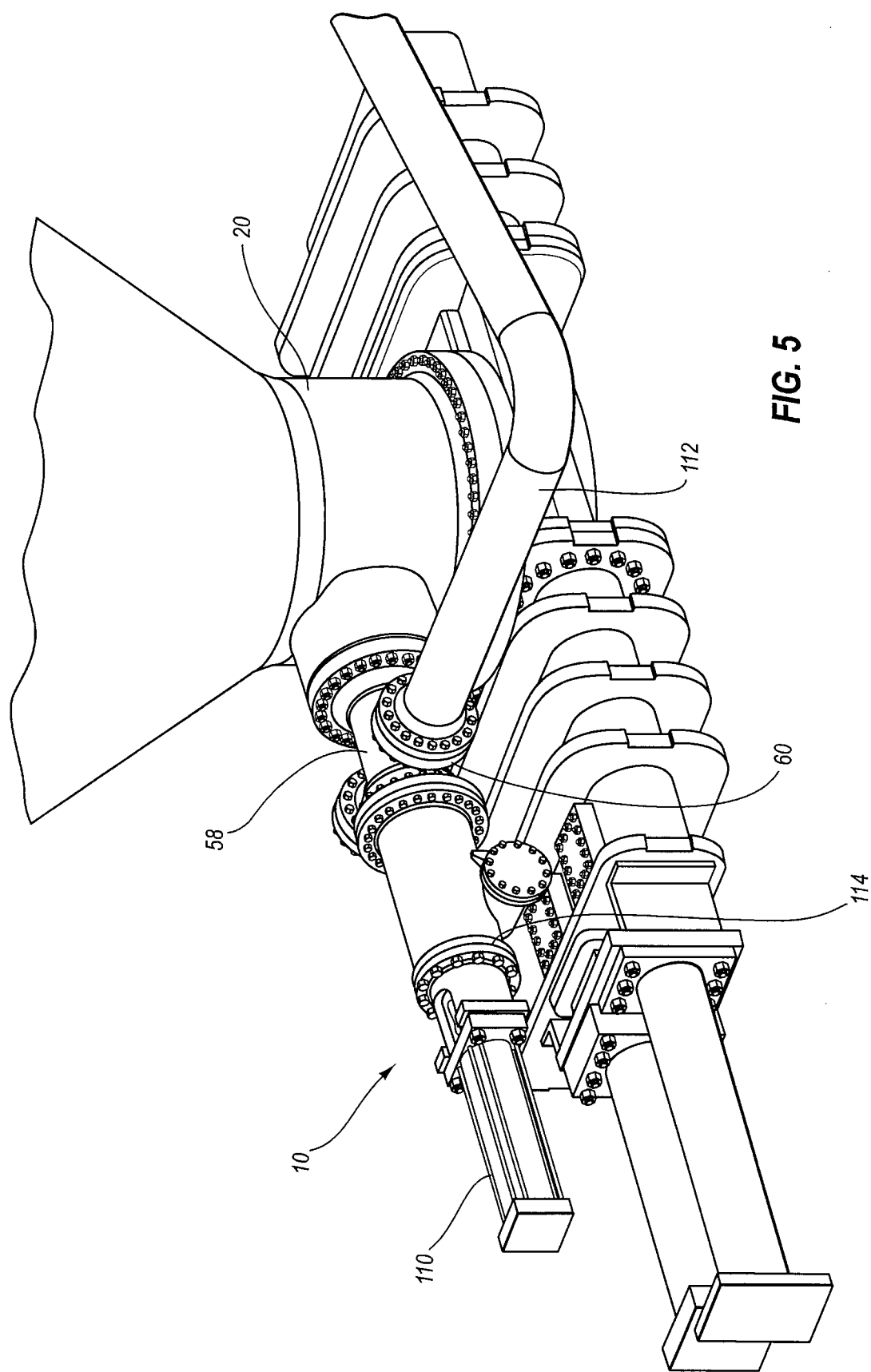
FIG. 5 illustrates a perspective view of a retractable injection nozzle according to an embodiment of the present invention.

Inlet sleeve 58 may function to receive the residual byproduct from the feed 112 and extends from flange 60 as shown. In some embodiments, inlet sleeve 58 may integrally form with a curved pipe segment 62 that is shown in FIGS. 3 and 4 to bend approximately 90° or with a pipe segment of a different shape. For example, as illustrated in FIGS. 5, 6 and 7, inlet sleeve 58 may be structured to form with a four way pipe segment 150. Curved pipe segment 62, or other shaped pipe segment, may also be designed to bend a significant amount less, or more, than is illustrated in FIG. 3 or 4, to accommodate installation of center feed system 10 into preexisting coker operations. For example, should a feed line in a particular coking operation require a more obtuse or acute angle, shaped pipe segment 62 may be designed accordingly. In other embodiments, shaped pipe segment 62 may also accommodate redirection of petroleum byproducts in a vertical axis, as well as the horizontal bend illustrated in FIGS. 3 and 4. In other embodiments, shaped pipe segment 62 may be manufactured to consist of more than on bend, allowing the inlet sleeve 58 to track a curvilinear path required for installation of the center feed system 10. Accordingly, the shaped pipe segment 62 allows the center feed system 10 to be manufactured to retrofit any existing decoking operation, flexibly allowing implementation of a center feed injection system 10 according to embodiments of the present invention to be implemented efficiently, and with minimal costs for installation.

In some embodiments, each of the feed line, inlet 58, shaped pipe segment 62 and retractable injection nozzle 14 are in fluid connection with one another when the retractable injection nozzle 14 is in an open position. When the injection system 10 is in an open position, residual byproduct may be allowed to travel through and ultimately be deposited within spool 20 and an attached coke drum. Steam, water or other fluids may also be allowed to travel through the center feed injections during various phases of the delayed cooking process.

However, when the retractable injection nozzle 14 is in a retracted position as illustrated in FIG. 4, the feed line inlet 58 and shaped pipe segment 62 may remain in fluid connection with the feed line but flow of residual byproduct through the center feed system into the coke drum is prevented. When retracted, the system 10 may additionally block the movement of particulate matter (e.g., coke fines) from entering the system 10 from the vessel as coke is cut away from the interior of the vessel.

Alternative structural configurations may be utilized for the inlet sleeve 58. Some examples of alternative structural configurations are shown in FIGS. 5, 6 and 7. As depicted in FIG. 5, an inlet sleeve 58 structurally shaped as a four-way valve may be utilized. As shown in FIGS. 5, 6, and 7, some embodiments of the center feed injection system 10 comprise a spool 20, a retractable injection nozzle 14, and an inlet sleeve 58 designed to operate within a coking system. The inlet sleeve 58 functions to deliver residual by-product, steam and/or quench fluid to the retractable injection nozzle. The inlet sleeve 58 may comprise a flanged component 60, allowing the inlet sleeve to couple to a feed line 112. As depicted in FIG. 5, feed line 112 may couple to the inlet sleeve 58 via a second flanged surface and may further comprise a third flanged surface 114 for connection to an actuator 110.

As previously mentioned, the modification of the structural shape of the inlet sleeve 58, may be accomplished to provide for adjusted flow characteristics and/or to ameliorate problems associated with the influx of residual by product, steam and/or quench fluid into a coking vessel. For example, thermal variances, uneven flow channeling, uneven quench characteristics and other issues experienced may be rectified. Additionally, thermal variance in the center feed system itself may be controlled, while allowing molten hydrocarbon feed stock to flow through the center feed system 10. FIG. 6 illustrates a cut-away view of an embodiment of a center feed system 10. Center feed system 10 may comprise various configurations of pipe that allow molten resid, steam or quench materials to be fed into a coking vessel. For example, center feed systems 10 may comprise a shaped four-way pipe segment 150 operably connected to a spool 20, and actuator 110. The retractable injection nozzle depicted in FIG. 6 is in an open position with the retractable injection nozzle 14 extended into the interior 30 of the spool 20. The inlet sleeve preferably comprises a flanged surface 60 proximate to, and being utilized to connect the inlet sleeve 58 to a feed line 112 and may further comprise a second flanged surface 61 for connecting the inlet sleeve 58 to the flanged inlet 6 of a spool 20. The inlet sleeve 58 may also comprise a third flanged surface 114 designed to connect the inlet sleeve 58 to the flanged surface of an actuator 110. In some embodiments, the inlet sleeve 58 is designed to hold and slidably connect to a retractable injection nozzle 14, allowing the injection nozzle 14 to move from an open position, as illustrated in FIG. 6, to a retracted position. Inlet sleeve 58 functions to receive residual by-product, steam and or quench fluid from the feed line 112. Some embodiments utilize a shaped four-way pipe segment 150 as depicted in FIGS. 5, 6 and 7, to regulate thermal gradients throughout the center feed system 10, due to the balanced symmetry of the center feed system 10 itself.

Regulating thermal gradients within the center feed system 10 itself reduces attendant wear of parts associate with the center feed system 10. For example, further some embodiments of the center feed system 10 may be structured to utilize a pipe system in configurations designed to control flow of resid, steam and/or quench materials through the feed system 10. Accordingly, while a four way pipe segment is depicted in FIG. 6, curved pipe segments depicted in prior FIGS. 3 and 4 and straight pipe segments illustrated in FIGS. 1 and 2, and additional configurations of pipe that allow molten resid, steam and/or quench fluids to be fed into a coking vessel are contemplated.

Center feed system 10 may be constructed from scheduled pipe or cast material to withstand and deliver the high temperature, high pressure residual byproduct as intended. Other sizes and materials may be used depending upon the particular end use, and as system requirements dictate. Indeed, although particularly suited to be used within a delayed coking process, the present invention may be utilized in other areas of manufacture, each requiring construction from different materials.

With reference to FIG. 3, as residual byproduct enters the inlet sleeve 58 of center feed system 10 from the feed line 112, it does so at a high temperature and velocity. Subsequently, the residual byproduct is routed through shaped pipe segment 62. The residual byproduct enters shaped pipe section 62 and encounters inlet 80 of retractable injection nozzle 14. Residual byproduct travels from inlet 80 through the retractable injection nozzle 14, and exits outlet 81.

In some embodiments the control over the injection site and flow of residual by product, steam and/or quench fluid being introduced into the interior of the spool and/or vessel may be controlled. For example, the angle of introduction relative to the spool may be controlled. As another example, as residual byproduct enters the interior 30 of the spool 20 and/or vessel, it does so near the center of the spool 20 in a direction preferably comprising a vertical component. In other embodiments, residual byproduct enters the interior 30 the spool 20 from a position other than center of the spool 20, including near the interior surface 30 of the spool itself. As another example, as dictated by the desired flow channeling of a particular system, the center feed system 10 may be utilized to inject by product, steam and/or quench fluid into the spool and/or vessel comprising a vertical directional component or any other desired angle.

Control over the injection site and angle of injection may be desirable. For example, the feed into the center of the interior 30 of the spool 20 may be utilized to ensure that the spool and the sidewalls of a coking vessel are exposed to a consistent flow of byproduct. As another example, the controlled flow of molten residual byproduct from the injection nozzle 14 may ensure that the exposure to molten residual byproduct is consistent across the entire surface area of the interior of the spool 20 and vessel, reducing the potential detrimental effects associated with repetitive thermal cycling. As another example controlled flow of molten residual byproduct from the injection nozzle 14 may ensure control over flow channeling patterns. As another example, quench characteristics and stripping volatile organic compounds from the coke bed may be controlled. Additionally, concerns associated with hot spots in a coke bed may be ameliorated.

With reference to FIGS. 5, 6 and 7, as residual by-product, steam and or quench fluid enters the inlet sleeve 58 of the center feed system 10 from the feed line 112 the residual by-product, steam and or quench fluid may be routed through the shaped four-way pipe segment 150 via an inlet sleeve 58, into the inlet 80 of the retractable injection nozzle. Residual by-product, steam and/or quench fluid may travel from the inlet 80 to the retractable injection nozzle 14 and exits outlet 81. Flow of residual byproduct into the spool and/or vessel may be controlled. For example, in some embodiments, as residual byproduct enters the interior 30 of the spool 20 and/or vessel, it does so near the center of the spool 20 in a direction preferably comprising a vertical component. In other embodiments, residual byproduct enters the interior 30 the spool 20 from a position other than center of the spool 20, including near the interior surface 30 of the spool itself. In some embodiments residual by product, steam and/or quench fluid may be introduced into the interior of the spool and/or vessel at an angle relative to the spool may be controlled. For example, as dictated by the desired flow channeling of a particular system, the center feed system 10 may be utilized to inject by product, steam and/or quench fluid into the spool and/or vessel comprising a vertical directional component or any other desired angle. In some embodiments, as residual by-product, steam and or quench fluid enters the interior 30 of the spool 20 and/or a coking vessel it does so near the center of the spool 20 and in a direction parallel with the vertical axis of the drum itself.

With reference to FIGS. 5, 6 and 7, in some embodiments, flow of residual byproduct, steam and/or quench fluids into the spool and/or vessel may be controlled. For example, the residual byproduct, steam and/or quench fluid may be dispensed in a direction comprising vertical component into spool 20 effectively controlling the injection of residual byproduct, steam and/or quench fluid into the spool and/or vessel. For example, injecting molten resid in a direction comprising a vertical component into the spool and/or vessel may produce a consistent pattern across the inner surface of the spool 20 and/or vessel, rather than impacting only the interior sidewall surface 22 at a perpendicular or substantially perpendicular manner as found in other designs. Additionally, the control exercised by the injection nozzle 14 of the present invention allows other characteristics associated with filling a vessel with molten resid, steam and/or quench fluids to be affected. For example, uneven flow channeling and hot spots remaining in a coke bed after quenching can be substantially reduced and controlled as the injection patterns and direction of molten resid, steam and/or quench fluids into a vessel are controlled. Nearly vertical or partially vertical dispensing may directly result from the positioning of center feed system 10, the angle of the curved segment of the interior cavity 82 of the retractable injection nozzle 14 and/or the presence of structural obstructive elements interior the center feed system 10. Accordingly, as the residual byproduct, steam and/or quench fluid passes through the retractable injection nozzle 14, into and through inlet 80 and exits outlet 81, the angle of injection of residual byproduct into the spool 20 can be controlled by utilizing different lengths of a retractable injection nozzle 14, by dictating the angle of curve of the curved segment of the interior cavity 82 or by introducing obstructive flow control elements interior the center feed system 10.

The outlet 81 of the retractable injection nozzle may comprise various configurations. FIGS. 9*a*, 9*b*, 10*a*, 10*b* and 11 illustrate perspective views of alternative outlets 81. As depicted in FIGS. 9*a* and 9*b*, outlet 81 comprises two openings 120, each of the two openings comprising a tapered collar 125. The tapered collar 125, associated with each of the two openings 120, may be designed with alternative structural configurations. As illustrated in FIGS. 9*a* and 9*b*, the first tapered collar 126 extends into the interior cavity 88 of the injection nozzle 14 a distance less than the second tapered collar 127. Accordingly, altering the shape of the inlet opening 81, utilizing collars or other structural flow control structures, modifying the shape of the collars or other flow control structures may affect the flow of residual by-product through the retractable injection nozzle 14 and co-commitantly affects the flow of residual by-product into the vessel and spool. As illustrated in FIGS. 9*a* and 9*b*, each collar may comprise a collar outlet 128, a collar inlet 130 and a collar body 132. Each of the collar inlet 130, collar outlet 128 and collar body 132 may be structurally modified to accomplish control of flow of residual by-product through the center feed system.

Additionally, the outlet 81 of the retractable injection nozzle 14 may be fitted with a flow control device. In some embodiments, a flow control device comprising a series of holes or perforations at the outlet 81 may be utilized to alter the flow of molten resid from the outlet. For example, a flow control device could be utilized to modify the laminar nature of the flow of the molten resid from the outlet. Similarly, flow control devices may be used at various points in the center feed system 10 to alter the flow of molten resid through the center feed system 10. For example, one or more flow control device(s) may be utilized to modify the laminar nature of the flow of resid, steam and/or quench fluid through the system, or to alter the nature of flow through the center feed system 10 in a desirable fashion.

In some embodiments residual byproduct exits the outlet 81 which has been structurally modified to accomplish control of flow of residual byproduct through the center feed system and into a coking vessel. In some embodiments residual byproduct exits the injection nozzle 14 in a direction that comprises a vertical component. In some embodiments, residual byproduct exits the outlet 81 at roughly a 90° angle relative to the entrance point on a side wall 22. As such the residual byproduct is not directed towards the opposite side of the vessel or spool 20. Alternatively, injection system 10 may be designed to introduce molten resid, steam and/or quench fluid into the vessel at about a 85°, 80°, 75°, 70°, 60°, 55°, 50°, 45°, 40°, or 35° angle relative to the entrance point on a side wall 22. Alternatively, injection system 10 may be designed to introduce molten resid steam and/or quench fluid into the vessel at about a 95°, 100°, 105°, 110°, 115°, 120°, 125°, 130°, 135°, 140° or 145° angle relative to the entrance point on a side wall 22.

In some embodiments, the particular angle of curved segment of interior cavity 82 and length of retractable injection nozzle 14 may vary depending upon system requirements and the size and dimensions of the vessels in which the material is being deposited. In a preferred embodiment, curved segment of interior cavity 82 comprises an angle between 0 and 90° to correspond to the range of angle desired within a particular coking vessel. In some embodiments, the curved segment of interior cavity 82 lies between 60 and 90°, effectively producing a vertical or nearly vertical spray of residual byproduct, steam and/or quench fluid exiting outlet 81, filling spool 20 and vessel in a desired fashion. Alternatively, embodiments may utilize a curved segment of the interior cavity 82 with between 30 and 60° angle relative to the point of entry inside the spool 20 producing a substantially vertical spray of residual byproduct into the spool 20 and coking vessel.

In some embodiments, a shorter retractable injection nozzle 14 may be used. Further the shorter retractable injection nozzle 14 may be utilized in conjunction with a curved segment of an interior cavity 82, such that the shortened length of the retractable injection nozzle is coupled with a curved segment of the interior cavity 82 with an angle designed to spray residual byproduct into the desired point in the interior of the coke drum. Alternatively, some embodiments utilize a longer retractable injection nozzle 14 placing the outlet 81 of the retractable injection nozzle 14 directly in the center of the spool 20 or even extending beyond the center of the spool 20. The longer retractable injection nozzle may be utilized in coordination with a more vertical curve in the curved segment of the interior cavity 82, such that the residual byproduct would be delivered directly at or near the center of the vessel and spool 20, or to the desired spot within the interior of the spool 20 to control the flow of residual by product, steam and/or quench fluid into the spool 20 and/or vessel.

FIGS. 3 and 4, for example, depict embodiments of the present invention in which a segment of retractable nozzle 14 is utilized that has insufficient length to extend the outlet 81 of the retractable injection nozzle 14 to the center of the spool 20. In accord with the desire to control the flow of residual by product and attendant filling of the spool and vessel, the angle of the curved segment of the interior cavity 82 may be adjusted appropriately to result in a spray of residual byproduct, steam and/or quench fluid being propelled with the desired angle of entry and velocity into the vessel. As such, various embodiments may further comprise use of different angles for the curved segment of the interior cavity 82 of the retractable injection nozzle 14 and also use of various lengths of the straight section 19 of the retractable injection nozzle 14 to ensure that the desired control over the flow of resid is exercised.

Further, some embodiments alter both the angle of the curved segment of the interior cavity 82 as well as the length of the straight section 19 of the retractable injection nozzle 14 to accommodate viscosity, velocities and temperature gradients of residual byproduct being pumped to the retractable injection nozzle 14.

Insert sleeve 58 and retractable injection nozzle 14 may comprises a uniform cross sectional area and/or interior diameter, or may comprise varying cross sectional areas or diameters. Designing the center feed system 10 to comprise varying cross sectional areas or diameters allows the center feed system 10 to provide for, and accommodate, varying volumes and velocities of residual byproducts, steam and/or quench fluid to be transported through the system, as well as to help control the flow of residual byproducts, steam and/or quench fluid for delivery within the spool 20.

The outlet 81 of the retractable injection nozzle 14 may also be constructed to be elliptical in design so as to accommodate material as it passes from the outlet 81 into the spool 20 and vessel. In various embodiments, the shape of the outlet 81 may be modified to accommodate various velocities and viscosities and material types being passed through the retractable injection nozzle 14. Additionally, the shape and size of the opening may be modified to control the spray pattern and flow characteristics of material and/or fluid ejecting from the outlet 81 of the retractable injection nozzle. For example, a larger outlet 81 may be used to reduce the velocity of residual byproduct material exiting the retractable injection nozzle 14. In other embodiments, a smaller outlet 81 may be used to produce a stream of higher velocity residual byproduct entering the spool 20 and vessel. In this fashion, the pattern of molten residual byproduct being ejected from the retractable injection nozzle 14 may be controlled, which increases longevity of vessels and spools, increases safety, improves yield of volatile organic compounds and effectively reduces the amount of downtime necessary for maintenance and repair.

FIG. 4 illustrates a cut away view of a spool 20, and center feed system 10 in a retracted position. During the process of delayed coking, residual byproduct is fed into the spool 20 and vessel until the vessel is completely or nearly filled. Once the desired level of residual material has been fed into the vessel, the flow of residual byproduct may be mixed with steam so that residual byproduct and steam flow into the vessel simultaneously, the ratios of residual byproduct and steam may be altered to increase yields of volatile organic compounds or to produce other desired effects. Additionally, the amount of steam relative to the amount of residual byproduct may be increased or decreased over time as a particular vessel fills. Once a vessel is full, the flow of residual byproduct may be stopped. In typical prior art decoking processes, the vessel is then quenched with water effectively cooling and hardening the residual byproduct. According to some embodiments of the present invention, the inlet sleeve 58 and retractable injection nozzle 14 may be utilized to pump steam and/or water into the spool 20 and vessel, effectively purging the inlet sleeve 58 and retractable injection nozzle 14 of any remaining residual byproduct and/or to allow for quenching of the vessel and its contents. This effectively clears the inlet sleeve 58 and retractable injection nozzle 14, and simultaneously quenches the vessel, reducing the amount of time and water utilized to quench the vessel. In preferred embodiments, once the inlet sleeve and retractable injection nozzle 14 have been purged with steam and/or water, the retractable injection nozzle 14 may be retracted as shown in FIG. 4.

Various methods for retracting the retractable injection nozzle 14 may be utilized according to embodiments of the present invention. In some embodiments, an actuator 110 may be attached to the first end of the retractable injection nozzle 86. The actuator 110 may be used to apply force to the retractable injection nozzle 14, effectively retracting the retractable injection nozzle 14 from the interior of the spool 30. As depicted in FIG. 4, the second end 85 of the retractable injection nozzle 14 then effectively forms a portion of the interior surface wall 22 of the spool 20. Retracting the injection nozzle 14 after a vessel has been filled, quenched and the inlet sleeve and retractable injection nozzle 14 have been purged, allows for subsequent removal of the hardened carbonaceous matter from a coking vessel, utilizing one of various techniques known in the art, without the risk of clogging the center feed system with coke fines or other particulate matter.

Typically, the hardened carbonaceous material is cut away from the interior of a vessel utilizing a high pressure water drill. As the solid carbonaceous material is cut away from the interior of the vessel, it falls though a port in the bottom of the vessel through the interior 30 of the spool 20 to an area below the vessel commonly referred to as the chute, where it is collected and discarded or utilized for subsequent purposes.

The process of delayed coking, and particularly the steps of directing a residual byproduct into an inlet from a feed source and allowing the residual byproduct to be dispensed or disposed within the vessel, comprises utilizing a dispenser that functions to dispose or direct the byproduct into the vessel.

As a feed line is attached to inlet 6, the residual byproduct in the feed line is received through opening 8 in inlet 6, routed through the pipe structure of inlet 6, and dispensed or disposed within vessel 2. During the fill cycle and/or once the vessel is full, steam may be piped through the inlet system into the vessel. Steam clears the inlet system 10 and strips the coke of valuable hydrocarbon by products, which are allowed to escape through the overhead feed line where they are typically routed to fractionators. Once all of the valuable hydrocarbon by products have been stripped from the coke resident in the vessel, steam is pumped into the vessel and released through an outlet to the blow down recovery area until the drum temperature of the vessel and its contents reaches approximately 500° F. Typically thereafter, water is pumped into the vessel through the inlet system and released into the blow down area until the contents of the vessel reach approximately 200° F. Once quenched the deheader valves are opened and the process of cutting coke from the interior of the vessel begins.

The simple design depicted in FIG. 1 may creates problems as coke is cut away from the interior of the vessel. Because the inlet 6 remains open in the simple system, coke fines and particulate matter would be allowed to accumulate in the inlet system, effectively clogging the inlet system. To ameliorate the clogging issue, some operations allow water to flow through the inlet system during the entire cutting process to ensure that the inlet system remains unclogged. In some operations 400-1000 gallons of water per hour are pumped through the inlet system during the cutting process to ensure that the inlet system remain unclogged.

Because some embodiments of the center feed system utilize a retractable injection nozzle as depicted in FIGS. 3-7, the retractable injection nozzle is not exposed to solid carbonaceous particles as they fall from the vessel to the chute below, effectively reducing clogging and/or damage that could be caused to the injection nozzle if allowed to remain exposed to the falling solid carbonaceous matter. Alternatively, the present invention contemplates utilizing a fixed injection nozzle with a slidable closure, which could be utilized to cover the outlet 81 of the fixed injection nozzle after a heating cycle but before the vessel is decoked. Alternatively, the invention contemplates utilizing a injection nozzle, which is connected to an actuator that would apply a tortional force to the injection nozzle once the vessel has been filled to a desired level with residual byproduct, such that the outlet 81 of the injection nozzle would point down, reducing the opportunity for solid carbonaceous material to pack into and clog the injection nozzle without effectively having to retract the nozzle itself from the interior 30 of a spool 20. However, in preferred embodiments, and as illustrated in FIGS. 3 and 4, a retractable injection nozzle 14 is utilized.

In addition to effectively sealing inlet 6 of the spool 20, the retractable injection nozzle 14 seals the opening in the curved pipe segment 63 blocking the flow of matter and/or fluid from inlet feeds 3. Once the solid carbonaceous material has been removed from the interior of the vessel by means utilized in the art, the vessel is clear and ready to be filled with additional residual byproduct. At a desired time, the retractable injection nozzle could then be moved to an open position as illustrated in FIGS. 3 and 5-7, reopening the passageway from the inlet sleeve 58, through the inlet 80, through the retractable injection nozzle 14 and to the outlet 81, allowing a subsequent cycle of residual byproduct to be pumped into the vessel. In this fashion, the process of filling, quenching and removing solid carbonaceous material from a coker vessel may be accomplished repetitively, with minimal damage to the coker vessel and spool of a delayed coker unit system.

Figure 8:
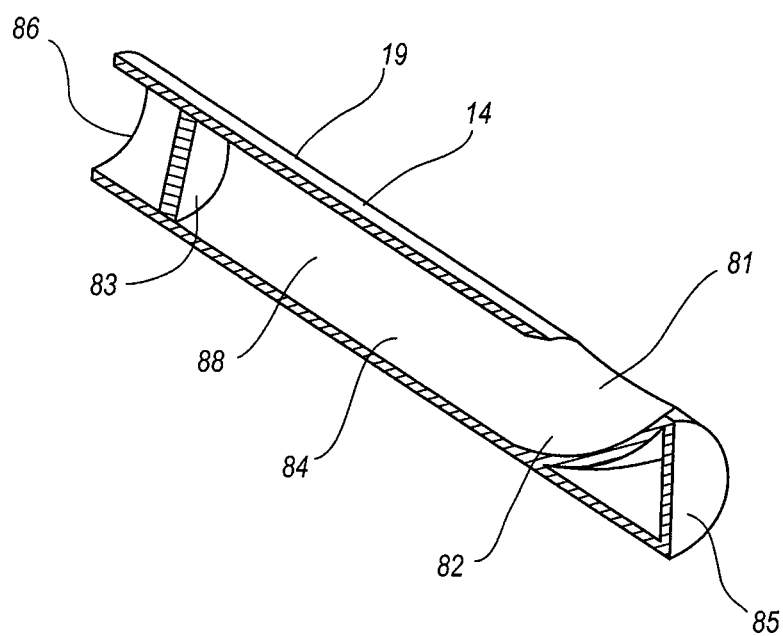
FIG. 8 illustrates a perspective view of a retractable injection nozzle according to one exemplary embodiment of the present invention.

FIG. 8 illustrates a cut away view of an injection nozzle, which may be a retractable injection nozzle 14. The depicted retracted injection nozzle, as utilized according to some embodiments of the present invention, comprises a first end of the retractable injection nozzle 86, an interior cap 83, an interior cavity 88, a straight segment of the interior cavity 84, a curved segment of the interior cavity 82, a second end of the retractable injection nozzle 85, and a straight section of the retractable injection nozzle 19. In preferred embodiments, the retractable injection nozzle 14 is structured as shown to allow the entire retractable injection nozzle 14 to slidably engaging the straight portion of an inlet sleeve 58, aligning a inlet 80 with the inlet sleeve 58 and exposing the outlet 81 of the retractable injection nozzle 14 to the interior of a vessel, effectively allowing residual byproduct to flow through the inlet sleeve 58 and retractable injection nozzle 14 from the outlet 81 into a vessel. As noted previously, the angle of the curved segment of the interior cavity 82 may be modified to adjust the flow characteristics of the residual byproduct, steam and/or quench fluid into the vessel as desired. Additionally, the shape and size of the outlet 81 may be modified as desired to produce desirable flow patterns of residual byproduct, steam and/or quench fluid into a vessel. Additionally, the length and diameter of the straight section 19 of the retractable injection nozzle 14 may be modified as desired to produce the desired flow of residual byproduct, steam and/or quench fluid through the injection nozzle 14 itself and into the interior of a spool 30 and vessel.

The first end of the retractable injection nozzle 86 may be structured to provide attachment to an actuating means, allowing the retractable injection nozzle 14 to interchangeably be moved to an open or retracted position to allow for subsequent cycles of coking and decoking of a vessel. Various actuator means are contemplated by the present invention. For example, electric actuating means, hydraulic actuating means, pneumatic actuating means and manual actuating means may all be utilized in accord with various embodiments of the present invention. One skilled in the art would appreciate that other actuating means are available and may be utilized in conjunction with the present invention to effect the desirable control over the opening and retracting of the injection nozzle 14 itself.

The present invention contemplates that the shape of the retractable injection nozzle 14 will conform to the interior cavity of the inlet sleeve. While depicted with a circular cross section in FIGS. 3-7, it is contemplated that the cross sectional shape of the interior of the inlet sleeve 58 and co-commitant shape of the retractable injection nozzle 14 itself may vary from circular. For example, the retractable injection nozzle may be structured to have an elliptical cross section. Altering the shape of the cross section of the retractable injection nozzle 14 may be desirable to alter flow characteristics and ejection pattern of residual byproduct. Different flow consistencies and velocities may dictate further that the interior cavity 88 of the retractable nozzle 14 as well as the interior cavity 88 of the inlet sleeve 58 structured to have disparate cross sections throughout the length of the straight section 19 of the retractable injection nozzle 14. For example, in some embodiments it is desirable to use, as shown a roughly cylindrical and straight interior cavity 88, while in other embodiments it is desirable that the interior diameter of the interior cavity 88 progressively increase or decrease along the length of the straight section 19 of the retractable injection nozzle 14 from the first end 85 of the retractable injection nozzle 14 to the second end 86 of the retractable injection nozzle 14, effectively decreasing or increasing resistance applied to the residual byproduct as it flows through the retractable injection nozzle 14.

As noted previously, the size and shape of the inlet 80 and outlet 81 may be altered to conform, as is the case, with inlet 80 with the shape of the interior of the inlet sleeve 58 at the curved pipe segment 63, allowing for fluid passage of residual byproduct through the inlet sleeve 58 and injection nozzle 14 without encountering resistance of obtrusive structural elements.

FIGS. 6, 7, 9a and 9b, each illustrate some embodiments of an injection nozzle 14. The depicted retractable injection nozzle 14 may comprise a first end of the retraction nozzle 86, an interior cap 83, an interior cavity 88, a straight segment of the interior cavity 84, a second end of the retractable injection nozzle 85, at least one opening 120 and in some embodiments, multiple openings 120, a tapered collar 125, wherein the tapered collar may comprise various elements including a collar outlet 128, a collar inlet 130, and a collar body 132. In some embodiments, the retractable injection nozzle 14 is structured as shown to allow the entire retractable injection nozzle 14 to slidably engage the straight portion of the inlet sleeve 58 aligning an inlet 80 with an inlet sleeve 58 and exposing the outlet 81 of the retractable injection nozzle 14 to the interior of the vessel, effectively allowing residual by-product, steam and or quench fluid to flow through the inlet sleeve 58 and retractable injection nozzle 14 from the outlet 81 into a vessel.

Figure 10A:
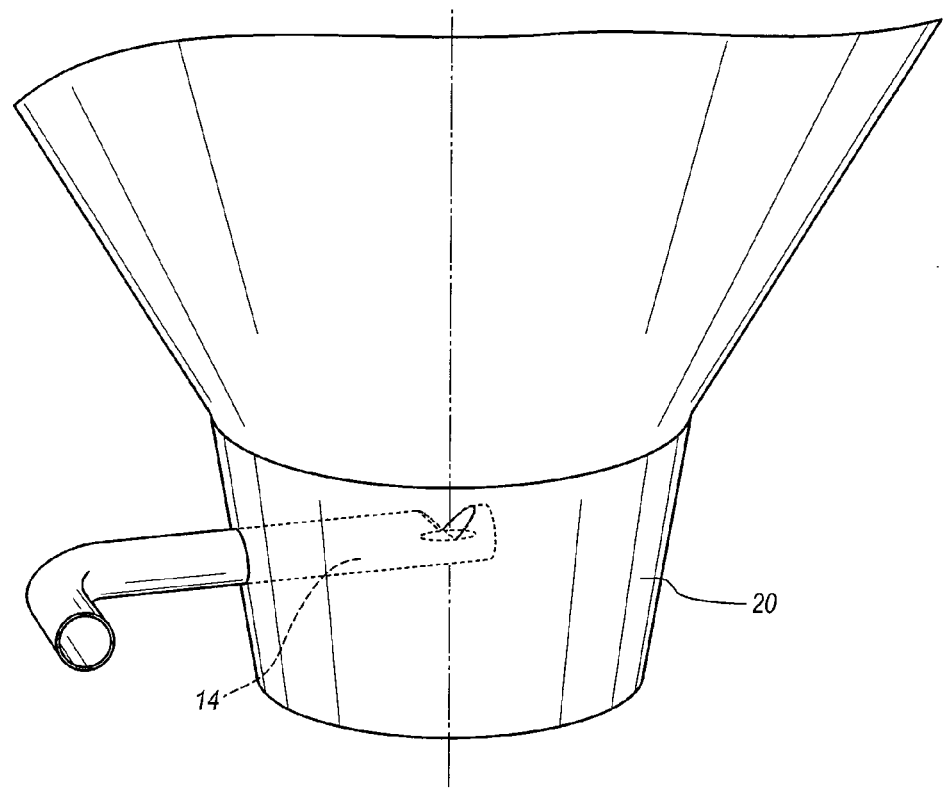
FIGS. 10a and 10b illustrate a perspective view of a retractable injection nozzle according to an embodiment.
Figure 10B:
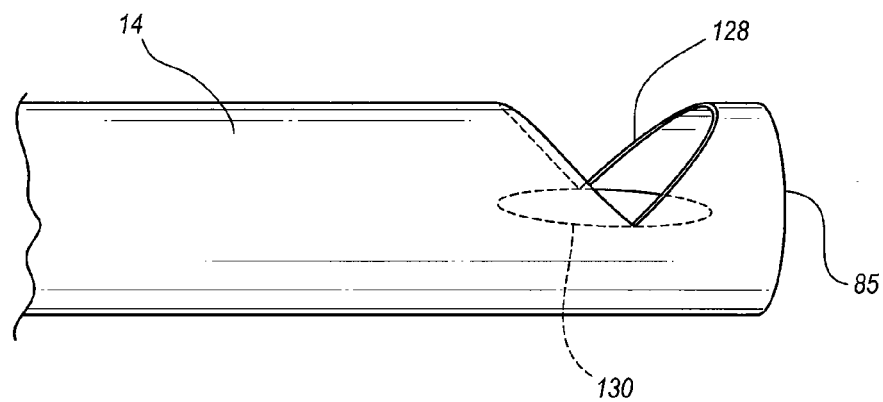

As previously noted, the use of multiple openings and a collar or other flow control apparatus may be utilized as desirable to produce desirable flow patterns of residual by-product, steam and or quench fluid into a vessel. As depicted in FIGS. 6, 7, 9a and 9b, embodiments of the invention utilize two outlets 81 disposed in a linear fashion on the top of the retractable injection nozzle 14, allowing the high pressure residual by-product to be injected upward, or at another desired angle, into a vessel. As depicted, the use of tapered collars 125 may also be utilized to alter flow patterns. Alternatively, as depicted in FIGS. 10*a* and 10*b*, a collared outlet 128 may be utilized in conjunction with a collar body 132 that is not tapered.

As depicted in FIGS. 6 and 7, the first end of the retractable injection nozzle 86 may be structured to provide attachment to an actuating means, allowing the retractable injection nozzle 14 to interchangeably move between an open and retracted position to allow for subsequent cycles of coking and decoking a vessel. Various actuator means and structures are contemplated by the present invention. As previously noted, examples of contemplated actuators include electric, hydraulic, pneumatic and manual actuating means or structures.

The retractable injection nozzle 14 may be structured to conform to the interior cavity of the inlet sleeve. As depicted in FIGS. 6 and 7, the retractable injection nozzle is designed with a circular cross section and is used in conjunction, as shown, with collar outlets 128 with circular cross sections, as well as collar bodies with circular cross sections. While each of these listed constitutive elements of the retractable injection nozzle 14 are depicted with circular cross sections, it is contemplated that alternative cross sectional shapes may be utilized. For example, the collar outlet 128 and collar body 132 may be structured to have elliptical cross sections. Altering the shape of the cross section of the retractable injection nozzle 14, the interior cavity 88, the straight segment of the interior cavity 84, the collar 125, whether tapered or not, the collar outlet 128, the collar inlet 130 and the collar body 132, may be desirable to alter flow characteristics and injection patterns of residual by-product. Different flow consistencies and velocities may dictate further that the various listed constitutive elements of the retractable nozzle 14 have disparate cross sections throughout the length of the section. For example, as shown in FIGS. 6 and 7, the interior cavity 88 has a cross section, which changes as residual by-product, steam and or quench fluid flows from the first end of the retractable injection nozzle 86 to the second end of the retractable injection nozzle 85. The utilization of multiple collared outlets substantially tapers the cross sectional view of the interior cavity 88 of the retractable injection nozzle 14.

Different flow consistencies and velocities may dictate further that the various constitutive elements of the retractable injection nozzle be structured to utilize different cross sectional shapes. For example, as illustrated in FIGS. 6 and 7, the tapered collar inlet 130 is structured with an elliptical cross sectional shape, while the collar body itself is structured with a circular cross sectional shape. Accordingly, in some embodiments it is desirable to use, as shown in FIGS. 1-5, roughly cylindrical and/or straight interior cavities 88, while in other embodiments, it may be desirable that the interior diameter of the interior cavity 88 progressively increase or decrease along the length of the straight section 19 of the retractable injection nozzle 14 from the first end 85 of the retractable injection nozzle 14 to the second end 86 of the retractable injection nozzle 14, effectively decreasing or increasing resistance applied to residual by-product, steam and or quench fluid as it flows through the retractable injection nozzle 14.

As previously noted, the size and shape of the inlet 80, 130 and the outlet 81, 128 may be altered to conform with the inlet 80, 130 with the shape of the interior of the inlet sleeve 58, allowing fluid passage of residual by-product, steam and or quench fluid through the inlet sleeve 58 and injection nozzle 14, without encountering resistance of obtrusive structural elements. Alternatively, obtrusive structural elements or flow control structures may be utilized to alter the flow patterns of residual by-product, steam and or quench fluid through the retractable injection nozzle 14 into the interior of the vessel. As depicted in FIGS. 6, 7, 9*a*, 9*b*, 10*a*, 10*b* and 11, various obstructive features are contemplated.

As depicted in FIGS. 6, 7, 9*a* and 9*b*, the use of tapered collars, which intrude into the interior cavity 88 of the retractable injection nozzle are utilized both to simultaneously alter the cross sectional shape of the interior cavity 88 of the retractable injection nozzle 14 itself, and to control the path of flow of residual by-product into the interior of a vessel. Alternatively, non-tapered collars 134 may be utilized.

As depicted in FIGS. 10*a* and 10*b*, various collar shapes and angles of the collar relative to the interior cavity 88 of the retractable injection nozzle may be utilized. For example, the collar as depicted in various figures is disposed at a right angle relative to the straight segment of the interior cavity 84 of the retractable injection nozzle 14. However, it is contemplated that collars may be disposed at some angle relative to the straight segment of the interior cavity 84 other than a right angle. For example, it is contemplated that a collar may be utilized in conjunction with the embodiment depicted in FIG. 5 such that the collar would be disposed at an obtuse or acute angle relative to the flow of by-product through the straight segment of the interior cavity 84.

In addition to altering the angle at which the collar body 132 is disposed relative to the flow of fluid through the straight segment of the interior cavity 84, it is contemplated that various shapes for collar outlets may be utilized. As depicted in FIG. 10, alternative cross sections to the collar outlet 128 may be utilized in order to alter flow characteristics and injection patterns of residual by-product, steam and or quench fluid. Additionally, as indicated in FIGS. 10 and 11, both the collar outlet 128 and angle of the collar body 132 may be altered relative to their position in relation to the drum center line or the axis of the drum.

Figure 11A:
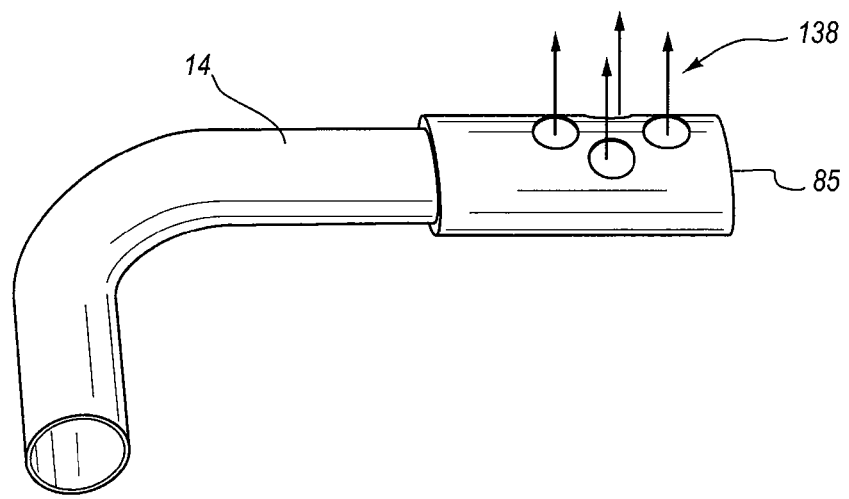
FIGS. 11a and 11b illustrate a perspective view of retractable injection nozzles according to embodiments of the present invention.

Alternative obstructive elements and flow control structures may be utilized. For example, FIG. 11*a* depicts the use of multiple outlets 138, each of which may be coupled with the use of a collar 125, 134, collar outlets 128, collar inlets 130 and collar body 132. Alternatively, the multiple outlets 138 may be associated with a singular collar, or may comprise an outlet for a single collar and be associated with a single collar 125, 134 and collar body 132, such that the flow of residual by-product, steam and or quench fluid through the retractable injection nozzle is guided through a single collar body 132 but is ejected into the vessel from multiple outlets 138.

Figure 11B:
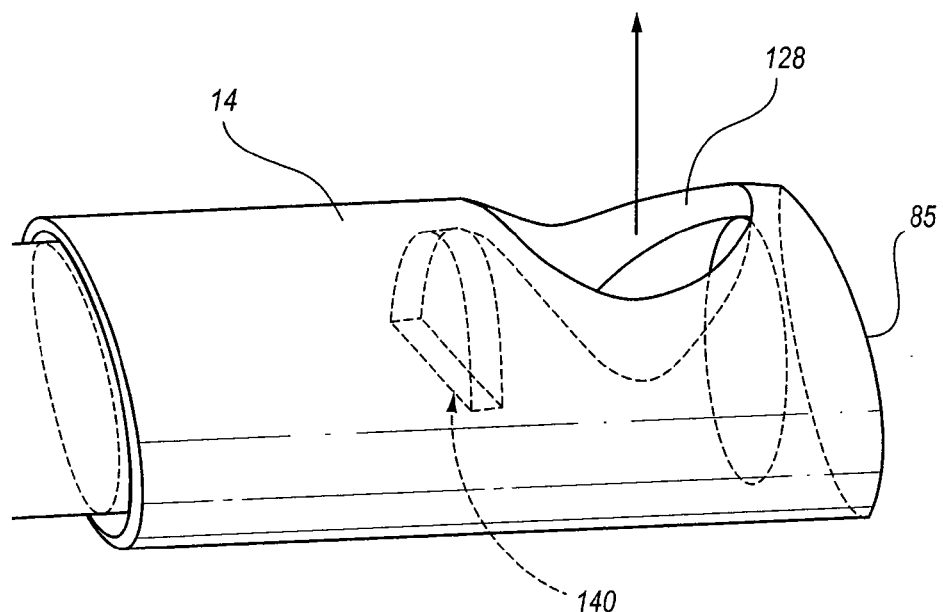

As another example, FIG. 11*b* illustrates the use of a baffle 140 as an obstructive element placed nearer the first end of the retractable injection nozzle 86 than the nozzle opening 81. Accordingly, a baffle 140 or multiple baffles 140 may be utilized to alter flow characteristics and injection patterns of residual by-product, steam and or quench fluid from an outlet 81. Various forms of outlets 81 may be utilized in conjunction with baffles 140 and it is contemplated that each of the outlet 81 designs discussed herein may be utilized in conjunction with a baffle 140 or multiple baffles 140.

It should be noted that the present invention center feed system 10 and dispenser system can be used with or coupled directly to a coke drum, eliminating the use of a spool 20 section. In this embodiment, the center feed system 10 and system would function as described above, only the residual byproduct would be dispensed directly into the coke drum.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes that come within the meaning and range of equivalency of the claims are to be embraced within their scope.

What is claimed and desired to be secured by Letters Patent is:

1. A center feed system for coking a drum comprising:
an inlet sleeve attached to a sidewall of a reservoir vessel; and
a retractable injection nozzle contained within the inlet sleeve, the retractable injection nozzle adapted to extend into the reservoir vessel to allow residual byproduct to flow therethrough and into the reservoir vessel, and adapted to retract from the reservoir vessel and into the inlet sleeve, wherein the retractable injection nozzle is shaped such that retracting the retractable injection nozzle into the inlet sleeve blocks the flow of residual byproduct through the retractable injection nozzle, and wherein the retractable injection nozzle includes a fluid obstruction apparatus.

2. The center feed system of claim 1, wherein the retractable injection nozzle includes more than one outlet through which the residual byproduct flows out into the reservoir vessel.

3. The center feed system of claim 2, wherein the retractable injection nozzle includes two outlets.

4. The center feed system of claim 1, wherein the fluid obstruction apparatus is selected from a group consisting of: a tapered collar, a baffle, a non-tapered collar, and a collar body.

5. The center feed system of claim 4, wherein the tapered collar comprises a tapered collared inlet, a collar body and a collar outlet.

6. The center feed system of claim 4, wherein the non-tapered collar body comprises a tapered collared inlet, a collar body and a collar outlet.

7. The center feed system of claim 1, wherein the fluid obstruction apparatus comprises an outlet with multiple holes.

8. The center feed system of claim 1, wherein the inlet sleeve comprises one of: a shaped four-way pipe segment or a curved pipe segment.

9. The center feed system of claim 1, wherein the retractable injection nozzle is cylindrical in shape.

10. The center feed system of claim 1, wherein the retractable injection nozzle comprises a first end attached to an actuator, and a second end structured to form a portion of the interior wall surface of the reservoir vessel when retracted.

11. The center feed system of claim 1, wherein at least one of the retractable injection nozzle or the inlet sleeve has a varying cross-sectional area.

12. The center feed system of claim 1, wherein at least one of the retractable injection nozzle or the inlet sleeve has a constant cross-sectional area.

13. The center feed system of claim 1, wherein said reservoir vessel is a coke drum.

14. The center feed system of claim 1, wherein said reservoir vessel is a spool attaching at least two flanged components together.

15. The center feed system of claim 1, wherein one of said inlet sleeve and said retractable injection nozzle has a varying cross-sectional area along its span to provide for and accommodate varying volumes of said residual byproduct.

16. The center feed system of claim 1, wherein said residual byproduct is dispensed within said reservoir vessel at an angle selected from the group consisting of between 0 and 90 degrees, between 20 and 30 degrees, between 30 and 60 degrees, and between 60 and 90 degrees.

17. The center feed system of claim 1, further coinrpising:
the reservoir vessel to which the inlet sleeve is attached.

18. The center feed system of claim 17, wherein the reservoir vessel is a coke drum, or a spool that is configured to attach to a coke drum.

19. A center feed system for coking a drum comprising:
a spool that is configured to attach to a coke drum;
an inlet sleeve attached to a sidewall of the spool; and
a retractable injection nozzle contained within the inlet sleeve, the retractable injection nozzle adapted to extend into the spool to allow residual byproduct to flow therethrough and into a coke drum to which the spool is attached, and adapted to retract from the spool and into the inlet sleeve, wherein the retractable injection nozzle is shaped such that retracting the retractable injection nozzle into the inlet sleeve blocks the flow of residual byproduct through the retractable injection nozzle, and wherein the retractable injection nozzle includes a fluid obstruction apparatus.

20. The center feed system of claim 19, wherein the fluid obstruction apparatus is selected from a group consisting of: a tapered collar, a baffle, a non-tapered collar, and a collar body.

* * * * *